United States Patent
Chi et al.

(10) Patent No.: US 6,879,742 B2
(45) Date of Patent: Apr. 12, 2005

(54) USING INTENSITY AND WAVELENGTH DIVISION MULTIPLEXING FOR FIBER BRAGG GRATING SENSOR SYSTEM

(75) Inventors: Sien Chi, Hsinchu (TW); Hong-Yih Tseng, Hsinchu (TW); Peng-Chun Peng, Junghe (TW); Jia-He Lin, Taoyuan (TW)

(73) Assignee: National Chiao Tung University, Hsinchu (TW)

( * ) Notice: Subject to any disclaimer, the term of this patent is extended or adjusted under 35 U.S.C. 154(b) by 29 days.

(21) Appl. No.: 10/436,294

(22) Filed: May 13, 2003

(65) Prior Publication Data

US 2004/0213501 A1 Oct. 28, 2004

(30) Foreign Application Priority Data

Apr. 24, 2003 (TW) ........................................ 92109647 A

(51) Int. Cl.[7] ................................................ G02B 6/26
(52) U.S. Cl. .............................. 385/12; 385/37; 385/42; 385/45; 385/47; 385/48; 356/478
(58) Field of Search ................................ 356/345, 356, 356/352; 385/37, 12, 13, 31, 41, 42, 45, 47, 48

(56) References Cited

U.S. PATENT DOCUMENTS 6,256,090 B1 * 7/2001 Chen et al. ................. 356/73.1
6,647,160 B1 * 11/2003 Chi et al. ..................... 385/12

OTHER PUBLICATIONS

M.A. Davis, et al.; Interrogation of 60 fibre Bragg grating sensors with microstrain resolution capability; Jul. 1996; pp. 1393–1394.
L. Zhang et al.; Enhanced FBG Strain Sensing Multiplexing Capacity Using Combination of Intensity and Wavelength Dual–Coding Technique; Dec. 1999; pp. 1638–1640.
Chi Chiu Chan et al.; Performance Analysis of a Time–Division–Multiplexed Fiber Bragg Grating Sensor Array by Use of a Tunable Laser Source ; Sep./Oct. 2000; pp. 741–749.
K.P. Koo et al.; Dense wavelength division multiplexing of fibre Bragg grating sensors using CDMA; Jan. 1999; vol. 35, No. 2, pp. 165–167.

* cited by examiner

Primary Examiner—Fayez G. Assaf
(74) Attorney, Agent, or Firm—Troxell Law Office, PLLC

(57) ABSTRACT

The present invention provides a fiber Bragg grating sensor system, which comprises a light-division device having receiving-sending terminals and sensing terminals, a light generating device and a photo detector coupled with receiving-sending terminal of a light-division device, sensing fibers coupled with the sensing terminals, said sensing fiber comprising a fiber Bragg grating, a information processor connecting with said photo detector. The light-division device distribute different optical energy ratio from said receiving-sending terminals to said sensing terminals. The intensity and wavelength division multiplexing can make different intensity for the information addressed of different sensing fiber on the same optical channel to enhance the sensing capacity of fiber Bragg grating sensor system.

5 Claims, 4 Drawing Sheets

USING INTENSITY AND WAVELENGTH DIVISION MULTIPLEXING FOR FIBER BRAGG GRATING SENSOR SYSTEM

REFERENCE CITED

[1] M. A. Davis et al., "Interrogation of 60 fiber Bragg grating sensors with microstrain resolution capability", Electronics Letters, Vol. 32, No. 15, pp. 1393–1394 (1996).
[2] L. Zhang et al., "Enhanced FBG strain sensing Multiplexing Capacity Using Combination of Intensity and Wavelength Dual-Coding Technique", IEEE Photonics Technology Letters, Vol. 11, No. 12, December 1999, pp. 1638–1640.
[3] C. C. Chan et al., "Performance Analysis of a Time-Division-Multiplexed Fiber Bragg Grating Sensor Array by Use of a Tunable Laser Source", IEEE Journal of selected topics in Quantum electronics, vol. 6, no. 5, pp. 741–749 (2000).
[4] K. P. Koo et al., "Dense wavelength division multiplexing of fiber Bragg grating sensors using CDMA", Electronics Letters, vol. 35, no. 2, pp. 165~167 (1999).

FIELD OF THE INVENTION

The present invention relates to a fiber Bragg grating (FBG) system, particularly to a high-resolution and high-capacity fiber Bragg grating sensor system with an intensity and wavelength division multiplexing scheme. Therefore, this invention can be employed to monitor temperature variation (such as controlling for medical engineering, civil engineering, industrial sensor, and monitoring the process of silicon wafer), strain variation (such as measuring for stratum slide and structural stress), and fiber communication network (such as monitoring for the reliability of the transmission data on network).

BACKGROUND OF THE INVENTION

Prior Arts

Lately, the fiber Bragg grating sensing system has become an important optical device in the field of fiber sensor. Its characteristic is that, when under temperature varying or strain varying, the Bragg wavelength will be varied so as to apply the optical device produced by such fiber sensor in a wider field, such as in the field of variation of strain and temperature etc. Moreover, the fiber communication possess multi-wavelength characteristic for different gratings on the same fiber. Therefore, its sensing capacity can measure signal from several sensor elements to millions sensor elements on the sufficient broadband source or tunable laser source.

The traditional fiber Bragg grating sensor system adapts broadband optical source for measuring its optical power reflectivity. In general, it uses wave division multiplexing technique in which the multiplexing number of the sensing gratings is limited by the reflective band of each fiber Bragg grating sensor and the whole bandwidth of the light source. The fiber sensing technique is proposed to the following four methods at present.

1 M. A. Davis et al., in "Electronics Letters", Vol. 32, No. 15, pp. 1393–1394 (1996), has provided an article of "Interrogation of 60 fibre Bragg grating sensors with microstrain resolution capability", which discloses using 1×4 and 1×2 electro-optics switch to monitor 12 Bragg gratings sensors for a total of 60 sensor elements. However, in this article, the structure can not simultaneously observe all sensor elements if the number of the sensor elements are over 60.

2 L. Zhang et al., in "IEEE Photonics Technology Letters", Vol. 11, No. 12, December 1999, pp. 1638–1640, has provided an article of "Enhanced FBG strain sensing Multiplexing Capacity Using Combination of Intensity and Wavelength Dual-Coding Technique", which discloses a tunable fiber Fabry Perot filter and an erbium-doped fiber amplifier providing scanning light source and using the different reflective fiber Bragg grating to intensity and wavelength division multiplexing. However, this kind of technology costs very high because fiber Bragg grating require specially made.

3 C. C. Chan et al., in "IEEE Journal of selected topics in Quantum electronics", vol. 6, no. 5, pp. 741–749 (2000), has provided an article of "Performance Analysis of a Time-Division-Multiplexed Fiber Bragg Grating Sensor Array by Use of a Tunable Laser Source", which discloses time-division multiplexing using delay fibers that demand the fast electric modulation technique. Thus, it may cost a lot for setting such structure, and it may be limited its application.

4 K. P. Koo et al., in "Electronics Letters", vol. 35, no. 2, pp. 165~167 (1999), has provided an article of "Dense wavelength division multiplexing of fiber Bragg grating sensors using CDMA", which discloses a code division and wavelength division multiplexing scheme for allowing close spectral spacing Bragg grating sensors without sensor spectral dynamic range limitation. But it requires the calculation of light-distance difference and needs mixed-wave device and low-pass filter on each fiber Bragg grating. By contrast, code division and wavelength division multiplexing technology is more difficult than the present invention; therefore, cost and technology ability are the consideration for application.

SUMMARY OF THE INVENTION

Accordingly, the present invention is directed to a using intensity and wavelength division multiplexing for fiber Bragg grating sensor system that substantially obviates one or more of the problems due to limitations and disadvantages of the related art.

Therefore, the present invention provides fiber couplers for different power ratio output to achieve light intensity multiplexing.

The main object of the present invention is to provide a tunable wavelength fiber laser.

Another object of this invention is to enhance the sensing capacity, signal-to-noise ratio, and sensing resolution.

The other object of this invention is to provide a long-distance remote sensing in a smart structure.

The present invention provides a fiber Bragg grating sensor system, which comprises a light-division device having two receiving-sending terminals and equal to or larger than two sensing terminals, a light generating device and a photo detector coupled with receiving-sending terminal of a light-division device, sensing fibers coupled with said sensing terminals, said sensing fiber comprising a fiber Bragg grating, a information processor connecting with said photo detector to calculate the backreflected wavelength. The light-division device distribute different optical energy ratio from said receiving-sending terminals to said sensing terminals. The light generating device is a fiber ring laser including an Erbium doped fiber amplifier. Therefore, the tunable-wavelength light signal from the light generating device output propagated through the light-division device and to fiber Bragg grating having different power ratio. The backreflected light from each fiber Bragg grating propagated into photo detector. The output signal from photo detector is fed into an information processor to accurately calculate the result based on the light signal power ratio and fiber lasing output wavelength. Moreover, the intensity and wavelength division multiplexing can make different intensity for the information addressed of different sensing fiber on the same optical channel to enhance the sensing capacity of fiber Bragg grating sensor system.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

Figure 1:
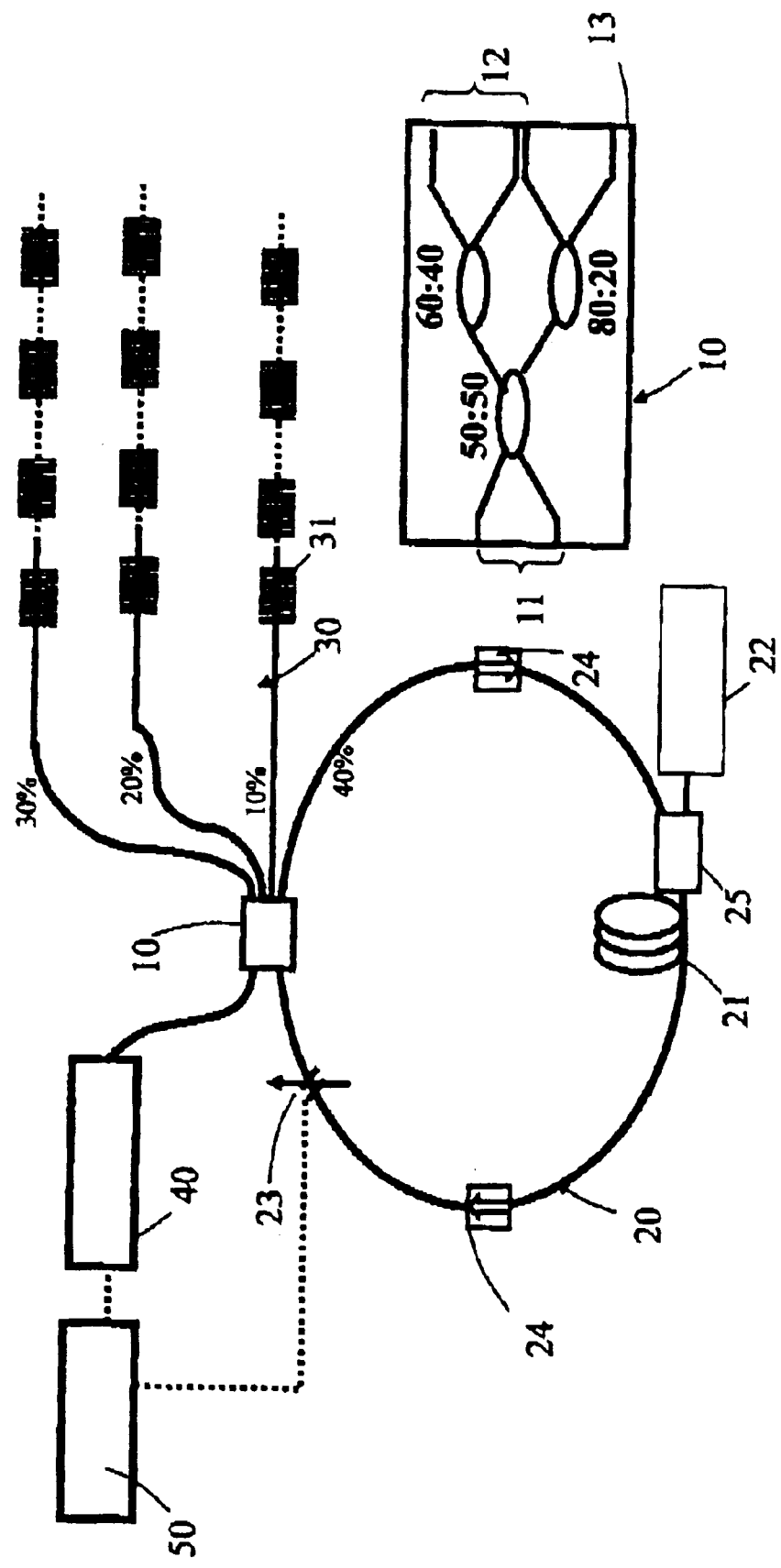
FIG. 1 is a diagram showing a preferred embodiment of the present invention.

The following descriptions of the preferred embodiments are provided to understand the features and the structures of the present invention.

The present invention provides a high-capacity fiber Bragg grating sensor system with an intensity and wavelength division multiplexing scheme. Its purpose is to provide a high capacity of variation of temperature or strain for industry. Please refer to the FIG. 1, we discloses a fiber Bragg grating sensor system; which comprises a light-division device 10, a light generating device 20 adapted for optical signal, sensing fibers 30, a photo detector 40 for detecting backreflected energy signal, an information processor 50.

The light-division device 10 comprises two receiving-sending terminals 11, sensing terminals 12 and a feedback terminal 13 for distributing different light power ratio from said receiving-sending terminals 11 to the sensing terminals 12 and the feedback terminal 13. The feedback terminal 13 is an optical feedback of light-division device 10.

The light generating device 20 adapted for optical signal, and said photo detector 40 coupled with said receiving-sending terminal 11 of said light-division device 10. The optical signal of light generating device 20 comprises tunable-wavelength light source. Said photo detector 40 detect backreflected energy of optical signal of light generating device 20 coupled with said receiving-sending terminal 11.

The sensing fibers 30 for receiving different-power optical signal coupled with sensing terminals 12 of said light-division device 10. The sensing fiber 30 at least comprising an tunable-wavelength fiber laser in which the corresponding Bragg grating 31 to form reflective signal for said photo detector 40.

The information processor 50 connects with said photo detector 40 to receive the data, and then calculate the backreflected wavelength and energy to make the test results. Because said light-division device 10 distributed the different power ratio launching into every sensing fiber 30, even reflective light of the same wavelength can distribute the different power ratio launching into every sensing fiber 30, the intensity and wavelength division multiplexing can make different intensity for the information addressed of different sensing fiber 30 on the same optical channel achieved the high-capacity fiber Bragg grating sensor system.

The light-division device 10 is constructed by couplers with the different coupling ratio. Said light generating device 20 is a fiber ring laser including an Erbium doped fiber (Er-Fiber) amplifier 21 connecting with said optical feedback 13 of said light-division device 10, a pump laser 22 coupling with said Er-Fiber amplifier 21 by coupler 25, a Fabry-Perot filter 23 coupling with said Er-Fiber amplifier 21 of wavelength division multiplexing, and a optical isolator 24 on each side of said Er-Fiber amplifier 21. Said information processor 50 substantially is a microprocessor.

With continuing reference to FIG. 1, the present invention of using intensity and wavelength division multiplexing for fiber Bragg grating sensor system schematically show the sensor system. The output of Er-Fiber amplifier 21 is the light signal which passes through optical isolator 24 with said Fabry-Perot filter 23, and then the feedback terminal 13 of said light-division device connect with said Er-Fiber amplifier 21 to construct a tunable fiber ring laser. The sensing terminals 12 are launched into sensing fiber 30 having fiber Bragg grating 31. Because said Fabry-Perot filter 23 is a tunable voltage optical filter, the light generating device 20 can filter different light wavelength by tunable voltage of said Fabry-Perot filter 23 to make different wavelength for fiber laser output. When the wavelength of lasing and fiber Bragg grating 31 are the same as each other, the backreflected light from each said fiber Bragg grating 31 propagated through the light-division device 10 and into the photo detector 40. The output signal from said photo detector 40 is fed into an information processor 50 to accurately analyze the signal.

The light-division device 10 provides the sensing terminals 12 with different power ratio. Then, each sensing fiber 30 possess different power ratio when said fiber Bragg grating 31 provide the same center wavelength in the different sensing terminals 12, the power ratio of reflective light can identify said fiber Bragg grating 31. In the conventional wavelength division multiplexing technique, the multiplexing number of sensing grating is limited by the reflective band of each fiber Bragg grating and the whole bandwidth of the light source, Therefore, the present of using intensity and wavelength division multiplexing is to enhance sensing capacity of fiber Bragg grating sensor system.

In order to show embodiment of the present invention, we use the experimental instrument to analyze experiment data. The Fabry-Perot filter 23 use an operating voltage range from 0V to 12V and selecting lasing wavelength within the working range from 1528 nm to 1572 nm. The light-division device 10 comprises two receiving-sending terminals 11, three sensing terminals 12, a feedback terminal 13 and three fiber couplers which is a 2×2 fiber coupler (coupling ratio 50:50), a 1×2 fiber coupler (coupling ratio 40:60) and a 1×2 fiber coupler (coupling ratio 20:80). Power ratio of said three sensing terminals 12 and a feedback terminal 13 is 10%, 20%, 30%, and 40% in order. The feedback terminal 13 connects with said Er-Fiber amplifier 21 and the said sensing terminals connect with said sensing fibers 30.

Figure 2:
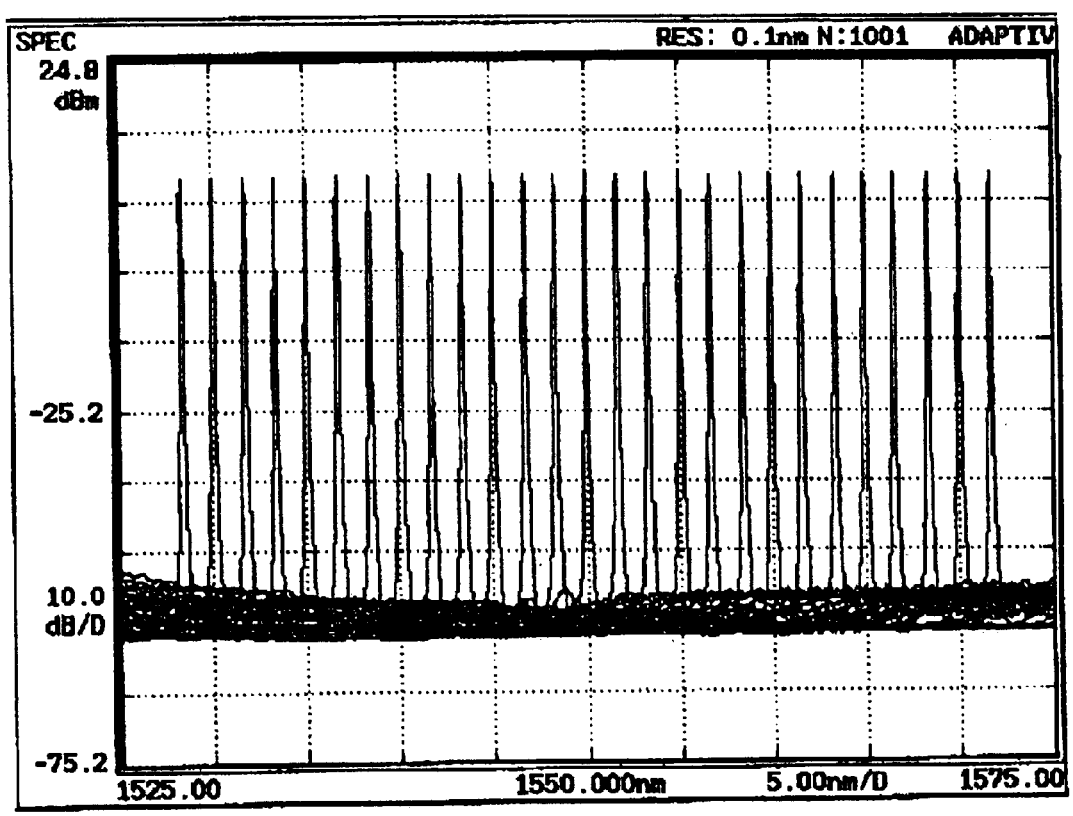
FIG. 2 is a diagram showing the output spectra of 30% lasing port within the working range from 1528 nm to 1572 nm in accordance with the preferred embodiment of the present invention.
Figure 3:
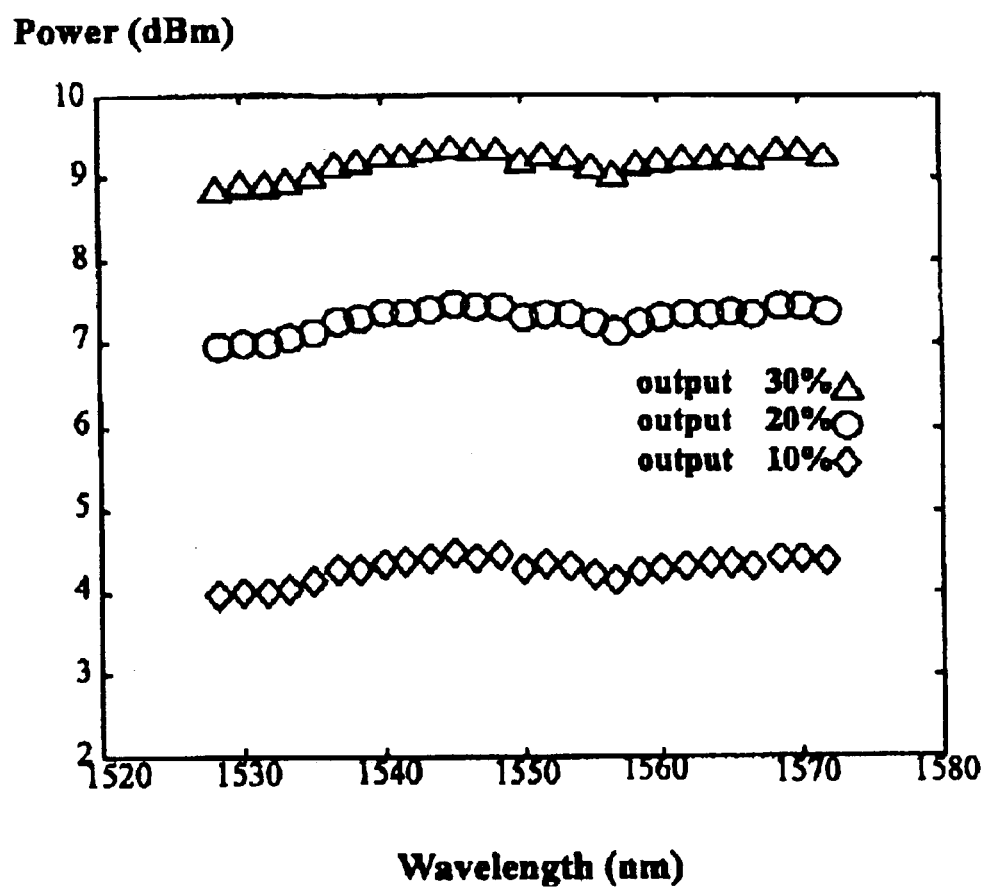
FIG. 3 is a diagram showing the output powers of the 30%, 20% and 10% lasing ports at different lasing wavelengths in accordance with the preferred embodiment of the present invention.

FIG. 2 shows the output spectra of light-division device 10 from the 30% fiber lasing port when we turned the Fabry-Perot filter 23 by using a voltage controller from 0V to 12V. FIG. 3 shows the output power of the 30%, 20% and 10% output ports at different lasing wavelengths. The average output power from the 30%, 20% and 10% lasing port are 9.16 dBm, 7.30 dBm and 4.26 dBm, respectively.

Figure 4:
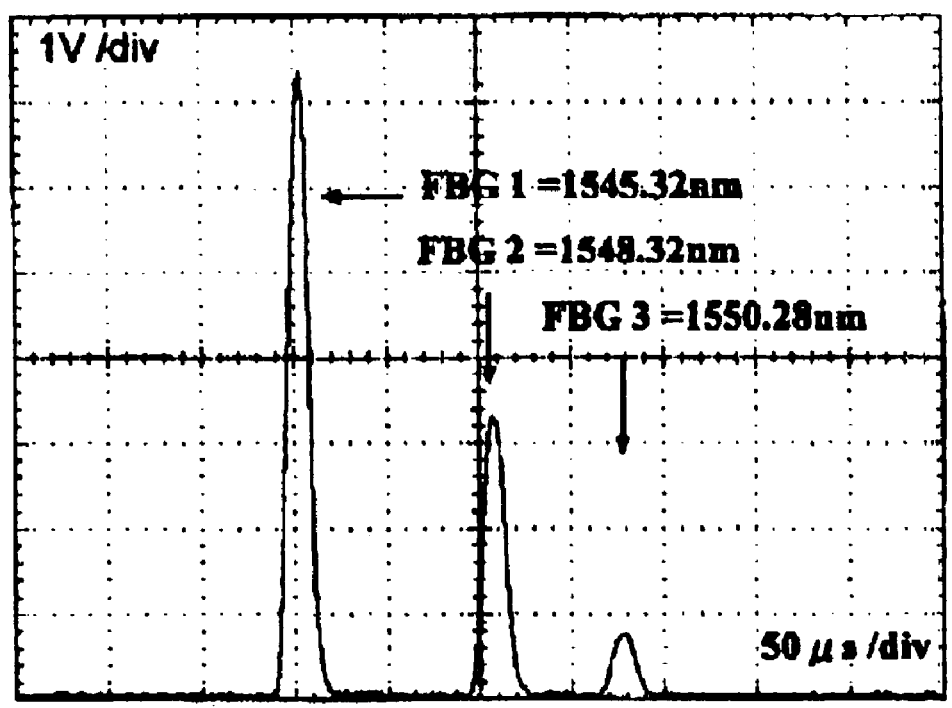
FIG. 4 is a diagram showing the output signals from the photo detector under the scanning Fabry-Perot filter operation in accordance with the preferred embodiment of the present invention. (Vertical scale is 1V/div. Horizontal scale is 50 µs/div.)

When the three fiber Bragg gratings 31 having different center wavelength connect with 30%, 20% and 10% output ports, the center wavelength of fiber Bragg gratings 31 is 1545.32 nm, 1548.32 nm, and 1550.28 nm in order. The Fabry-Perot filter 23 is driven by using a scanning sawtooth waveform of function generator to sweep the wavelength range of the fiber Bragg gratings 31, and then the photo detector 40 connect with an oscilloscope to observe the backreflected light from each fiber Bragg gratings 31. FIG. 4 shows the output signal from the photo detector 40 under the scanning Fabry-Perot filter 23 operation to identify said fiber Bragg gratings 31.

Finally, in contrast with a conventional broadband source, the light source of the present invention a tunable fiber laser, that can enhance the signal-to-noise ratio (SNR) and the three time capacity for the system. These advantages facilitate the accurate measurement that is sufficiently reliable against the noisy environments, especially for the long-distance remote sensing in a smart structure.

The fiber Bragg grating sensing system provided by this invention uses intensity and wavelength division multiplexing to develop a high-capacity sensing scheme. Therefore, the present invention is a reasonable perfection invention with features of high output optic power, high SNR, and high resolution and high capacity.

The present invention may increase the resolution and capacity of the sensor signal, and it also may detect the signal instantly, which does not only possess a better practicality, neither only a conception based on familiarity of utilization, it is non-obviousness.

Moreover, this invention may be widely applied for physics parameters with high precision for a long term. Further, it may have a long distance for measuring and monitoring temperature system, which is useful.

In summation of the foregoing section, the invention herein fully complies will all new patent application requirement and is hereby submitted to the patent bureau for review and the granting of the commensurate patent rights.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A using intensity and wavelength division multiplexing for fiber Bragg grating sensor system, which comprises:
   a light-division device having two receiving-sending terminals and equal to or larger than two sensing terminals for distributing different light power ratio from said receiving-sending terminals to said sensing terminals;
   a light generating device adapted for optical signal coupled with said receiving-sending terminal, said optical signal having optical channels of the classification of wavelength;
   sensing fibers coupled with said sensing terminals, said sensing fiber at least comprising a fiber Bragg grating to form reflective signal corresponding to said optical channel;
   a photo detector for detecting backreflected energy signal coupled with said receiving-sending terminal; and
   an information processor connecting with said photo detector to calculate the backreflected wavelength, wherein said light-division device comprises a feedback terminal which is an output obtained by said receiving-sending terminal to output fixed power ratio, that is optical feedback of light-division device.

2. The using intensity and wavelength division multiplexing for fiber Bragg grating sensor system of claim 1, wherein said light generating device is a fiber ring laser including an Erbium doped fiber (Er-Fiber) amplifier connecting with said optical feedback, a pump laser coupling with said Er-Fiber amplifier, a Fabry-Perot filter coupling with said Er-Fiber amplifier, and a optical isolator on each side of Er-Fiber amplifier.

3. The using intensity and wavelength division multiplexing for fiber Bragg grating sensor system of claim 2, wherein said pump laser is selected from the group consisting of wavelength 980 nm, and 1480 nm and Er-Fiber pump source.

4. A using intensity and wavelength division multiplexing for fiber Bragg grating sensor system, which comprises:
   a light-division device having two receiving-sending terminals and equal to or larger than two sensing terminals for distributing different light power ratio from said receiving-sending terminals to said sensing terminals;
   a light generating device adapted for optical signal coupled with said receiving-sending terminals, said optical signal having optical channels of the classification of wavelength;
   sensing fibers coupled with said sensing terminals, said sensing fiber at least comprising a fiber Bragg grating to form reflective signal corresponding to said optical channel;
   a photo detector for detecting backreflected energy signal coupled with said receiving-sending terminal; and
   an information processor connecting with said photo detector to calculate the backreflected wavelength, wherein light-division device substantially is a 2×4 fiber coupler which output comprises three sensing terminals and a feedback terminal in which the power ratio is 10%, 20%, 30%, and 40% in order.

5. The using intensity and wavelength division multiplexing for fiber Bragg grating sensor system of claim 4, wherein said 2×4 fiber coupler comprises a 2×2 fiber coupler (coupling ratio 50:50), a 1×2 fiber coupler (coupling ratio 40:60) and a 1×2 fiber coupler (coupling ratio 20:80).

* * * * *